(12) United States Patent
Cotton

(10) Patent No.: US 7,373,798 B2
(45) Date of Patent: May 20, 2008

(54) FLOWMETER/PROVER SYSTEM AND METHOD

(76) Inventor: Galen Cotton, 2226 Bauer Dr., Houston, TX (US) 77080

( * ) Notice: Subject to any disclaimer, the term of this patent is extended or adjusted under 35 U.S.C. 154(b) by 308 days.

(21) Appl. No.: 11/340,374

(22) Filed: Jan. 26, 2006

(65) Prior Publication Data
US 2007/0169536 A1 Jul. 26, 2007

(51) Int. Cl.
*G01F 25/00* (2006.01)
(52) U.S. Cl. ...................................................... 73/1.34
(58) Field of Classification Search ...................... None
See application file for complete search history.

(56) References Cited

U.S. PATENT DOCUMENTS

| | | |
|---|---|---|
| 3,273,375 A | 9/1966 | Howe |
| 3,580,045 A | 5/1971 | Pfrehm |
| 4,372,147 A | 2/1983 | Waugh et al. |
| 4,475,377 A | 10/1984 | Halpine |
| 4,606,218 A | 8/1986 | Chisman, III |
| 4,619,134 A | 10/1986 | Bohm et al. |
| 5,392,632 A | 2/1995 | Umeda et al. |

OTHER PUBLICATIONS

Elliott, Kenneth D., "*API's Microprocessor Based Flowmeter Testing Programme*", Omni Flow Computers Inc., International School for Hydrocarbon Measurement (ISHM), University of Oklahoma, 2005, pp. 1-14.
Slide Presentation developed by Cotton Products, LLC, entitled "Temporal Correction of Flowmeter Output with Liquid Flowmeter Provers and the Impact of Computationally Derived Flow Integration on Reproducibility of the Meter Factor", Dec. 2005.

*Primary Examiner*—Robert Raevis
(74) *Attorney, Agent, or Firm*—Kenneth L Nash

(57) ABSTRACT

A pulse production interval measurement module (or temporal reconciliation module) for preferred use with a computational flowmeter to thereby temporally reconcile or time shift flowmeter output produced by a volume of fluid flow through the computational flowmeter with the start and stop times of the flow of a calibrated fluid volume through a prover. The pulse production interval measurement module may be implemented with software and/or hardware and operate on stored data or real time or near real time measurements. Timing signals are sampled or collected with respect to one or more measurement elements within the computational flowmeter from which the measurement time interval for the flowmeter is determined.

20 Claims, 5 Drawing Sheets

FLOWMETER/PROVER SYSTEM AND METHOD

BACKGROUND OF THE INVENTION

1. Field of the Invention

The present invention relates generally to flowmeters and provers and, more particularly, to a system and methods for proving flowmeters which provide computationally derived readings of fluid flow, such as ultrasonic flowmeters and Coriolis mass flowmeters.

2. Description of the Background

As referred to herein, flowmeters that mechanically integrate the flow profile and produce representative output pulses are referred to as mechanical or non-computational flowmeters, because they contain components that move in response to fluid flow such as turbines, vanes, paddles, or the like, that are mechanically related to the flow. In these meters, a number of turns of a turbine, for instance, may be utilized to determine the flow with minimal or no computations required. Computational flowmeters, as used herein, refers to flowmeters to measure fluid flow without use of mechanically moving elements within the fluid flow path. Examples of computational flowmeters include ultrasonic flowmeters and Coriolis mass flow meters. Meters of this type integrate the flow field through data assimilation and calculation. Both computational and non-computational flowmeters may produce pulses wherein the number of pulses is related to measurement of fluid flow.

Meter provers use a calibrated section of pipe with appropriate starting and ending sensors. A flag or displacer moves between the starting and ending sensors along with a calibrated fluid column. The meter prover provides a means of comparing a known volume (the volume between the detectors) with the reported throughput of the meter.

In many cases, valuable fluid flows through pipelines. In such cases, it is absolutely necessary to verify meter operation at regular intervals so that proper accounting may be made for the volume of fluid that flows through the pipeline. By proving the meters on a regular basis, e.g., monthly, the flowmeter accuracy can be verified so that accounting requirements are satisfied. Flowmeter inaccuracies may be caused by temporary problems due to the passage of contaminants through the line. Flowmeter inaccuracies may also be more of a permanent nature due to flowmeter wear, obstruction, and the like. Wear is especially prominent on the non-computational or mechanical flowmeters. On the other hand, the computational flowmeters have little wear due to the absence of moving mechanical components within the flow stream.

Meter provers are of several types. Large volume meter provers utilize a large calibrated volume and are heavy and bulky. Small volume meter provers utilize a small calibrated volume of fluid. The small volume meter provers are compact and portable and may be readily used in the field to test the flowmeters. Small volume meter provers may often be called dual chronometry provers because these provers utilize two highly accurate clocks to control and process the collection of meter pulses. A representative dual chronometer meter prover 10 is shown in FIG. 1. In this example, region 12 in flow tube 14 between first detector 16 and second detector 18 is the calibrated volume. The process collects only whole pulses produced by the flowmeter and thereby avoids the difficulty of reconciling partial pulses against the prover's collected volume. This is accomplished by starting the pulse collection with the first whole pulse as indicated at 20 after first detector 16 in the prover 10 is tripped by flag or displacer 24. The pulse may be started at the zero crossing, rising, falling edges, selected trigger levels, or the like as desired. Simultaneously, a high speed clock begins timing the duration of the pulse collection as discussed below. This process ends when the leading edge, or other selected portion of the first pulse is encountered as indicated at 22 after the second prover detector 18 is tripped. The meter prover computations result in producing a meter factor K which provides the number of pulses from the flowmeter per unit of volume through the pipeline.

As a practical matter, the small volume meter provers with dual chronometers are often the only economical means for proving flowmeters for pipelines in the field. However, it has been found that the computational flowmeters produce unacceptable variations when tested at different times by dual chronometry small volume provers. The computational flowmeter variations may be decreased to an acceptable level when tested using large volume meter provers. However, the large volume meter provers are not practical for field use where the flowmeters are tested. Due to these problems, computational flowmeters are not always acceptable for use in pipelines for accounting purposes where it is required that the flowmeters be successfully proved.

However, it would be highly desirable and economical to be able to utilize the computational flowmeters in such pipelines due to the fact that computational flowmeters have less wear than the non-computational flowmeters with moving parts. Use of computational flowmeters could provide more reliable measurements without the need to change out flowmeters so frequently. Efforts have been made in the past by those of skill in the art to correct these problems, but solutions have not been found that are acceptable by the pipeline industry.

In more detail, dual chronometry provers utilize two clocks to control the collection of meter pulses so as to collect only whole pulses and avoid the difficulty of reconciling partial pulses against the prover's collected volume. As noted above, meter prover 10 has two spaced apart detectors between which is an exactly calibrated volume 12. Flag or displacer 24 is released for proving and flows with the fluid in flow tube 14. Pulse collection of pulses 26 produced by the flowmeter to be tested is started with the first whole pulse as indicated at 20 produced after first detector 16 in prover 10 is tripped by displacer 24. Simultaneously, a high speed clock begins timing the duration of the pulse collection, i.e., the time between the points indicated at 20 and 22.

Double chronometry pulse interpolation uses a high frequency master oscillator which increments time very precisely (e.g., 0.000001 parts of a second). This master oscillator operates two counters which may be referred to herein as time counter "A" and time counter "B." Time counter "A" is started when displacer or flag 24 trips first detector switch 16. Time counter "B" is started with the leading edge of the first flowmeter pulse as indicated at 20 after counter "A" has started. Counter "A" is stopped when displacer or flag 24 trips final detector switch 18. Time counter "B" is stopped with the leading edge of the first flowmeter pulse after counter "A" has stopped as indicated at 22. Using the ratio of the counter time "A" and counter time "B" will allow for accurately counting a fraction of a flowmeter pulse as shown below:

$$K \text{ in pulses/unit volume} = (\text{Time } A \text{ in seconds}/D \text{ in unit volume}) \times (C \text{ pulses/Time } B \text{ in seconds})$$

where:

K=K-Factor or pulses per unit volume from the flowmeter

A=Time for displacing calibrated volume measured by first time counter

B=Time for whole flowmeter pulses measured by second time counter

C=Total number of whole flowmeter pulses

D=Calibrated volume

Typical Example for 12" Small Volume Prover:

A=000.58377 seconds as determined from time counter "A"

B=000.58329 seconds as determined from time counter "B"

C=Accumulated whole pulses produced by the tested flowmeter as determined by a pulse counter (the pulse counter may or may not be part of the flowmeter)

D=Known displaced volume between the first time counter and the second time counter (e.g., as determined by water draw certification)

In this example K=0.58377 seconds/0.35714bbl×364 pulses/0.58329 seconds.

Accordingly K=1020.0468 pulses per bbl (or other unit of volume)

The following patents disclose various types of provers.

U.S. Pat. No. 3,273,375, issued Sep. 20, 1966, to Howe, discloses a calibrating barrel. More particularly, the invention relates to an apparatus for calibrating a flow meter. Still more particularly, the invention relates to an improved calibrating barrel for use in an apparatus to calibrate flow meters, the invention being characterized by increased accuracy, economy of construction and dependability.

U.S. Pat. No. 3,580,045, issued May 25, 1971, to Pfrehm, discloses a bidirectional meter prover adapted to be connected to a conduit having a meter arranged therein with a valve means connected to the calibration barrel of the meter prover and to the meter such that the valve means is rapidly shifted for movement of the piston in the meter prover in either direction in the calibration barrel for proving the meter. The meter prover is adapted for proving meters used for metering cryogenic liquids with the cryogenic liquid being introduced into the meter proving system and with the cryogenic liquid being vented as the system is cooled to equilibrium temperature; venting is stopped while introduction of cryogenic liquid is continued until thermal equilibrium is reached. Thereafter, the system is operated to prove the meter at equilibrium temperature.

U.S. Pat. No. 4,372,147, issued Feb. 8, 1983, to Waugh et al, discloses a flow meter prover which includes an outer fluid housing having an inlet and an outlet, a measuring conduit coaxially mounted within the outer housing and having first and second sets of fluid apertures adjacent, respectively, the upstream and downstream ends thereof, a fluid barrier mounted within the annular cavity between the outer housing and the conduit, a controllable piston mounted within the conduit, an actuating rod axially projecting from the downstream side of the piston where the free end of the rod extends through the downstream end of the outer housing, a bypass valve connected between the inlet and outlet of the outer housing, and first and second piston detection switches spaced apart along the length of the measuring conduit. There are provisions for automatically correcting for variations in the dimensions of the measuring conduit due to variations in fluid temperature. The prover also includes apparatus for continuously monitoring the integrity of the piston seals, and may be operated with equal fluid pressure on both sides of the piston.

U.S. Pat. No. 4,475,377, issued Oct. 9, 1984, to Halpine, discloses an apparatus for use in calibrating a meter having an outer tubular housing closed at each end, a reduced diameter and reduced length inner tubular barrel supported within the outer house providing an annular space between the exterior of the barrel and the interior of the housings, two spaced apart ports in the housing communicating with the annular area, an annular flange secured to the interior wall of the housing having an opening therein receiving the barrel and an annular flange between the exterior of the barrel and the interior of the housing—dividing the annular space into two portions, the annular flange being arranged so that the barrel may be easily and expeditiously removed while ensuring that no leakage occurs past the flange, a free piston in the barrel and piston detection switches spaced apart on the barrel providing means of indicating passage of precise amount of gas or liquid through the barrel.

U.S. Pat. No. 4,606,218, issued Aug. 19, 1986, to Chisman, III, discloses a compact bidirectional meter prover mechanism that incorporates a straight calibration barrel having spaced detectors sensing passage of a fluid induced displacer piston. A four-way control valve is connected by flow conduits to the conduit containing the flow meter and is connected by a conduit system to respective extremities of the calibration barrel. Launch valves are interposed between the control valve and the calibration barrel and are selectively positioned to permit metering flow through the calibration barrel only after the control valve has been positioned for directional flow of fluid through the conduit system and the calibration barrel. Thus, the necessity for piston prerun is eliminated and minimum cycle time is permitted. The length of the calibration barrel is also minimized by elimination of piston prerun.

U.S. Pat. No. 4,619,134, issued Oct. 28, 1986, to Bohm et al, discloses a testing device for at least one flow meter installed in a pipeline. The device includes a calibration container connected to the pipeline across a switch-over valve. A measuring piston is guided for reciprocating movement in the container between a starting and a terminal position. The measuring piston supports two signal releasing rings which are spaced apart from the other about a distance which when multiplied by the inner clearance of the calibration container determines a calibration volume of the measuring path of the piston. At least one signal generator is installed in the wall of the calibration container and cooperates in a contactless manner with the first and second signal releasing rings so as to produce start and stop pulses for one measuring cycle. The flow meter is connected to a pulse generator responsive to the flow rate and connected to an evaluation circuit which after completion of a measuring cycle compares the counted pulses with the calibration volume.

U.S. Pat. No. 5,392,632, issued Feb. 28, 1995, to Umeda et al, discloses a small volume prover which is compact and capable of obtaining highly reliable measurement, keeping a highly accurate base volume without being affected by temperature and pressure of fluid to be measured. The prover includes a cylindrical outer housing having a fluid inlet and a fluid outlet spaced apart from each other, a cylindrical measuring conduit having both open ends and first and second sets of fluid ports radially made in a wall thereof and coaxially mounted within the outer housing and an annular wall mounted between the outer housing and the measuring conduit at the position between the measuring conduit open end and the first set of ports thereof to form an upstream annular passage and a downstream annular passage. During proving preparation a piston is restrained by a piston actuator provided in the outlet-side end of the outer housing to permit the fluid to pass through the annular passage. At the time of measurement start, the piston is released to run and a valve actuator provided at the inlet side acts as a slide valve to close the first sets of fluid holes.

The above cited prior art does not provide a solution to the aforementioned problems. As noted above, it has been found that when utilizing the dual chronometer small volume prover, that K when determined at the measurement proving intervals, e.g., monthly or quarterly or the like, has varied out of range for the computational flowmeters or flowmeters with no required moving parts in the flow path. This problem is not observed in functioning non-computational flowmeters or flowmeters with moving parts within the flow path. Consequently, there remains a long felt need for improved methods for proving computational flowmeters utilizing dual chronometer small volume provers. Because those skilled in the art have recognized and attempted to solve these problems in the past, they will appreciate the present invention which addresses these and other problems.

SUMMARY OF THE INVENTION

It is an object of the present invention to provide an improved flowmeter/proving system and method.

It is another object of the present invention to detect the problems related to dual chronometer small volume proving errors in computational flowmeters.

It is yet another object of the present invention to provide an improved computational flowmeter or meter which requires no moving parts in the flow path.

It is yet another object of the present invention to provide an improved dual chronometer small volume prover (tester).

It is yet another object of the present invention to provide an improved proving method.

It is yet another object of the present invention to provide that computational flowmeters or flowmeters that do not need moving parts can be reliably proved and thereby utilized in pipelines for accurate measurement with reduced flowmeter wear problems.

These and other objects, features, and advantages of the present invention will become apparent from the drawings, the descriptions given herein, and the appended claims. However, it will be understood that the above-listed objectives and/or advantages of the invention are intended only as an aid in quickly understanding aspects of the invention, are not intended to limit the invention in any way, and therefore do not form a comprehensive or restrictive list of objectives, and/or features, and/or advantages.

Accordingly, the present invention may comprise a flowmeter/proving system for proving a computational flowmeter. The computational flowmeter may produce a flowmeter output signal for measuring fluid flow through the computational flowmeter. The computational flowmeter may comprise one or more measurement elements. The prover may comprise a timer for measuring a time interval A during which a calibrated volume of fluid flows within a prover. In one possible non-limiting example, the system may comprise a temporal reconciliation assembly for correlating in time the flowmeter output signal with the measured time A to permit comparison between a volume of fluid flow through the computational flowmeter and the calibrated volume of fluid flow through the prover.

In one possible embodiment, the temporal reconciliation assembly may be operable for determining a delay or interval time C and/or produce signals related to interval time C or some part of interval time C. The interval time C may comprise a time measurement beginning with electrical, magnetic, vibrational or other type of excitation of one or more of the measurement elements in a computational flowmeter until the resulting production of an output signal.

The flowmeter output signal may or may not comprise a series of flowmeter pulses. In one embodiment where the flowmeter output signal is a series of flowmeter pulses, the interval time C might in one embodiment comprise measurement from electrical excitation of a measurement element until production of a flowmeter pulse.

The flowmeter/proving system may further comprise a timer B for measuring a whole number of the flowmeter pulses. For instance, the timer B may be started at a first whole pulse after interval time C, or some portion thereof, after timer A starts. The timer B may be stopped after a last whole pulse which occurs after timer A stops, and then after interval time C, or some selected portion thereof. Time shifting may be utilized to take the stored information of timer A or timer B or timer C and shift the information one way or the other.

In another embodiment of the invention, the invention may comprise a time shifting method for shifting the time of a series of flowmeter output pulses for comparison with the calibrated flow volume that flows in the interval defined by starting and stopping timer A. Some time interval, which may be selected in various ways as discussed hereinafter, may be added or possibly subtracted as desired for the particular testing situation. In one possible preferred embodiment, the time shifting may preferably be used to match the measured flowmeter volume with the timing of the calibrated flow volume of timer A.

In another embodiment, the invention may comprise a flowmeter. The flowmeter may comprise one or more measurement elements for measuring fluid flow. The flowmeter may comprise no moving parts within the fluid flow. The flowmeter may, if desired, produce a series of output pulses in response to the fluid flow. The flowmeter may further comprise a measurement element or multiple measurement elements for excitation to thereby produce the series of output pulses. Additional elements may comprise a pulse interval measurement module operable for producing one or more signals representative of one or more delays or time intervals, such as between the excitation of the measurement element and production of an output pulse in response to the excitation.

A flowmeter may further comprise one or more measurement elements wherein a pulse interval measurement module is operable for producing one or more signals representative of one or more delays or intervals between an initial excitation of at least one of the one or more measurement elements and the output pulse.

In another embodiment of the invention, a method for proving a computational flowmeter may comprise one or more steps such as, for instance, determining a correction interval or time interval C between a measurement of fluid flow within the computational flowmeter and a flowmeter output for said measurement. Other steps may comprise determining a time interval for a calibrated volume of fluid to flow through a pipe, and utilizing the correction interval for selecting a time interval of the flowmeter output which corresponds to the calibrated volume of fluid.

The step of determining a time for the calibrated volume of fluid through a pipe may comprise starting a clock A and stopping a clock A. The method may then further comprise selecting the time interval of the flowmeter output by starting a clock B after starting clock A, and after the interval. The method may be implemented with software, hardware, and/or a combination of software and hardware. The method may be implemented utilizing already data which is collected and stored. Thus, the measurement results may or may not be determined in real time.

While the present invention will be described in connection with presently preferred embodiments, it will be understood that it is not intended to limit the invention to those embodiments. On the contrary, it is intended to cover all alternatives, modifications, and equivalents included within the spirit of the invention and as defined in the appended claims.

DESCRIPTION OF PRESENTLY PREFERRED EMBODIMENTS

Figure 1:
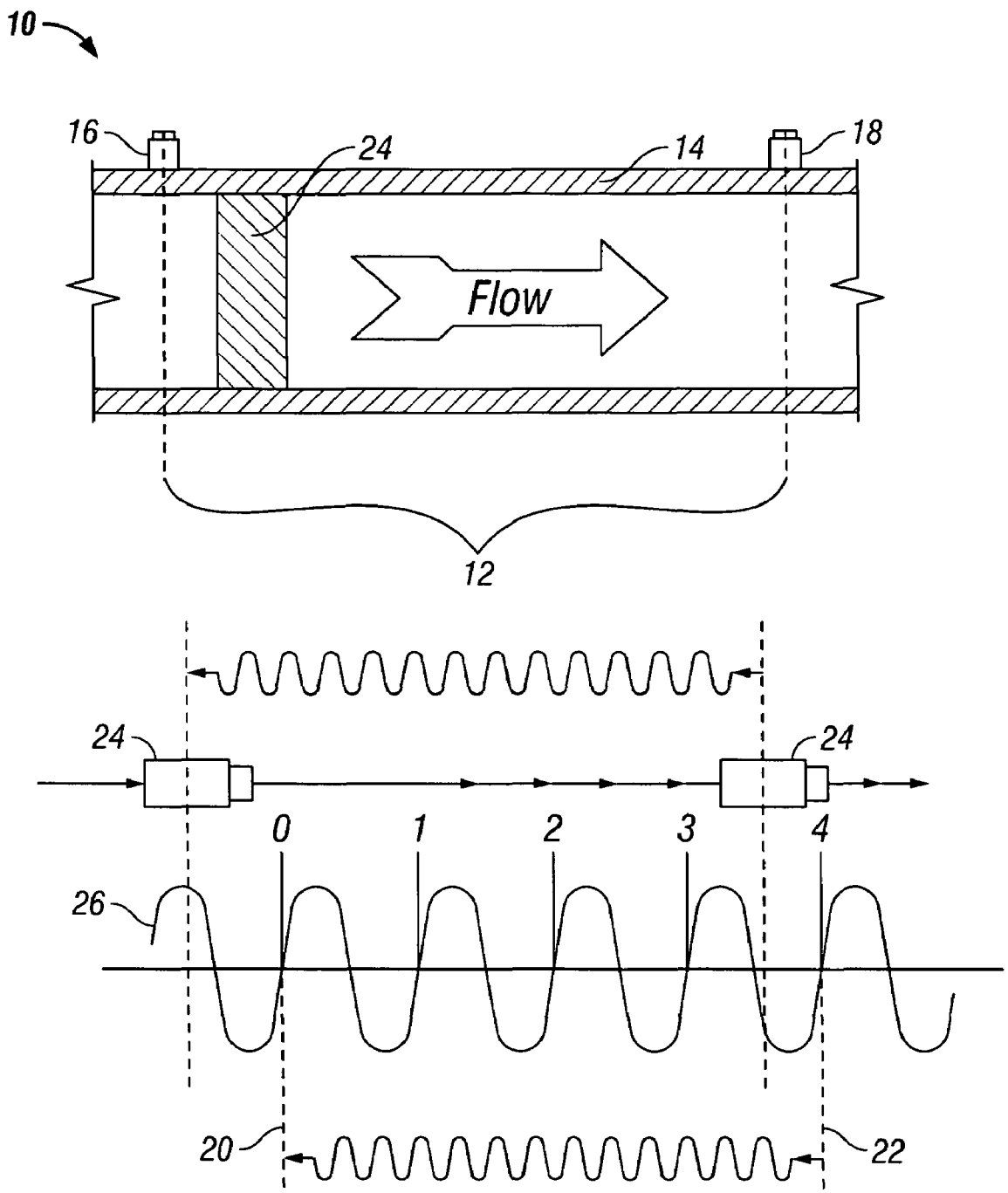
FIG. 1 is a side elevational view schematic, in cross-section, of a double chronometry prior art prover which illustrates the principal of operation of the two clocks used with flowmeter pulses.
Figure 2:
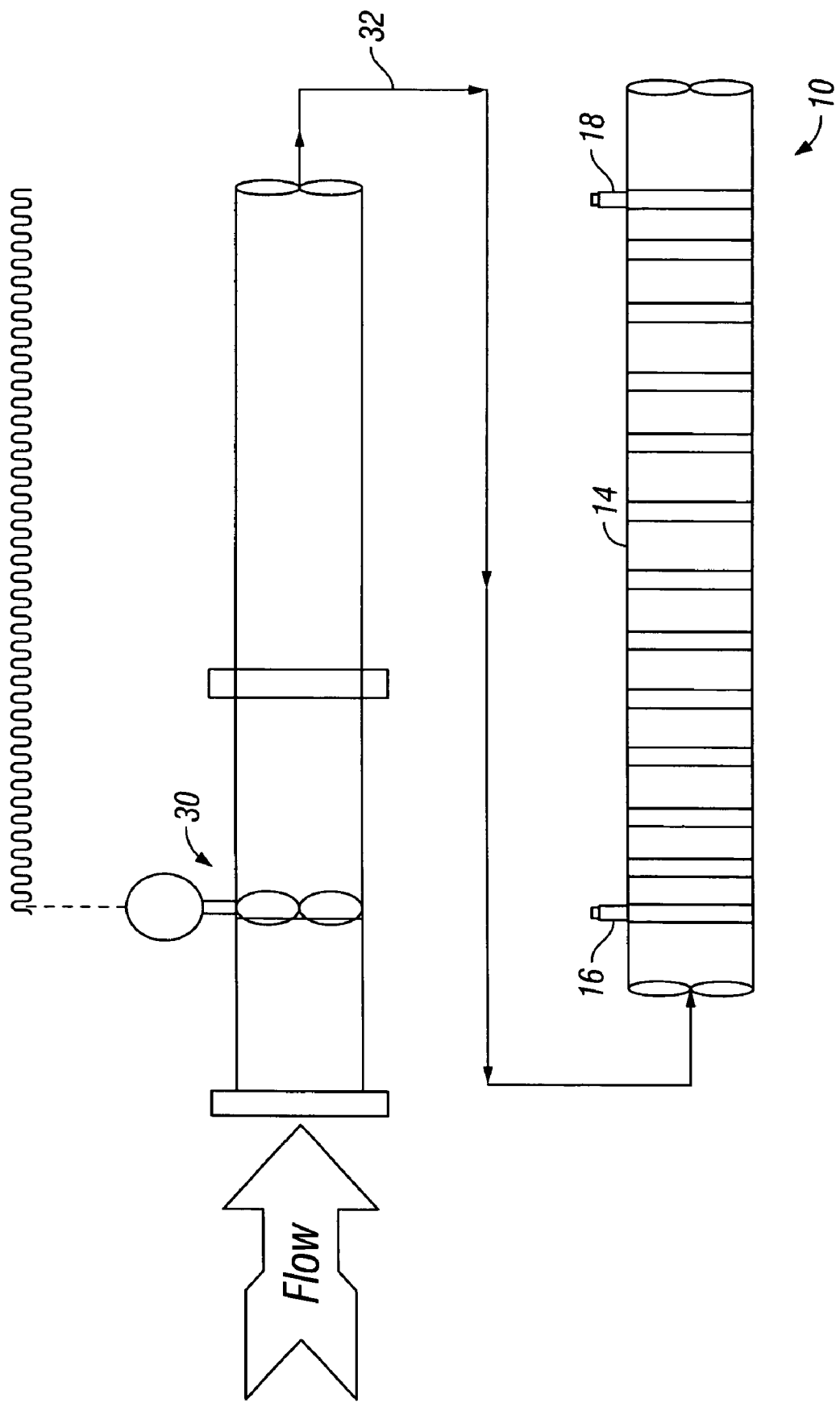
FIG. 2 is a side elevational view schematic, in cross section, showing the synchronous (analogous) behavior in liquid columns wherein the calibrated portion of pipe of the double chronometry prover downstream from a non-computational flowmeter is synchronous with the measurement of the same volume flowing through the non-computational flowmeter.

Referring now to the figures, and more particularly to FIG. 2, the synchronous (analogous) behavior in liquid columns is illustrated. The calibrated portion of pipe 14 of the double chronometry prover 10 between first detector 16 and second detector 18 downstream from the non-computational flowmeter 30 flow synchronously with respect to the same volume of fluid that flows through non-computational flowmeter 30. In line, liquid volumetric meter provers, such as prover 10, rely at least in part on synchronous or analogous behavior of the liquid column, indicated schematically at 32, in order to function. Simply stated, substantially uncompressible fluid 32 moving through flowmeter 30 will correlate with an equal increment of fluid further along the line, i.e., the calibrated volume of fluid between first detector 16 and second detector 18. Accordingly, using a calibrated section of pipe 14 with appropriate starting and ending sensors 16 and 18, and a displacer indicated schematically at 24 (in FIG. 1) that can move between starting and ending sensors with the fluid column, provides a means for determining meter accuracy. This method provides a means of comparing a known fluid volume (the fluid volume between the detectors) with the reported throughput of the meter.

Non-computational meters, such as non-computational flowmeter 30, that mechanically integrate the flow profile produce representative output pulses that are well correlated in time with the measurement event. This is because the mechanical movement is directly converted into pulses by the flowmeter electronics. No appreciable delay in signal transmission is introduced in the process as a result of either processing or wait states in the integration process, which occurs in computational meters. In other words, output signal production of the non-computational flowmeter is contiguous with the integration process. Therefore, the pulse train produced by non-computational flowmeter 30 measures a fluid volume which is analogous to the calibrated fluid volume during the same time interval, even though it is not the same calibrated fluid volume. If the pulse output of the non-computational flowmeter is started and stopped with the measurement of the time interval required for the calibrated fluid volume to flow past the detectors 16 and 18, then the same liquid volume as the calibrated volume will have flowed through the non-computational flowmeter 30.

Figure 3:
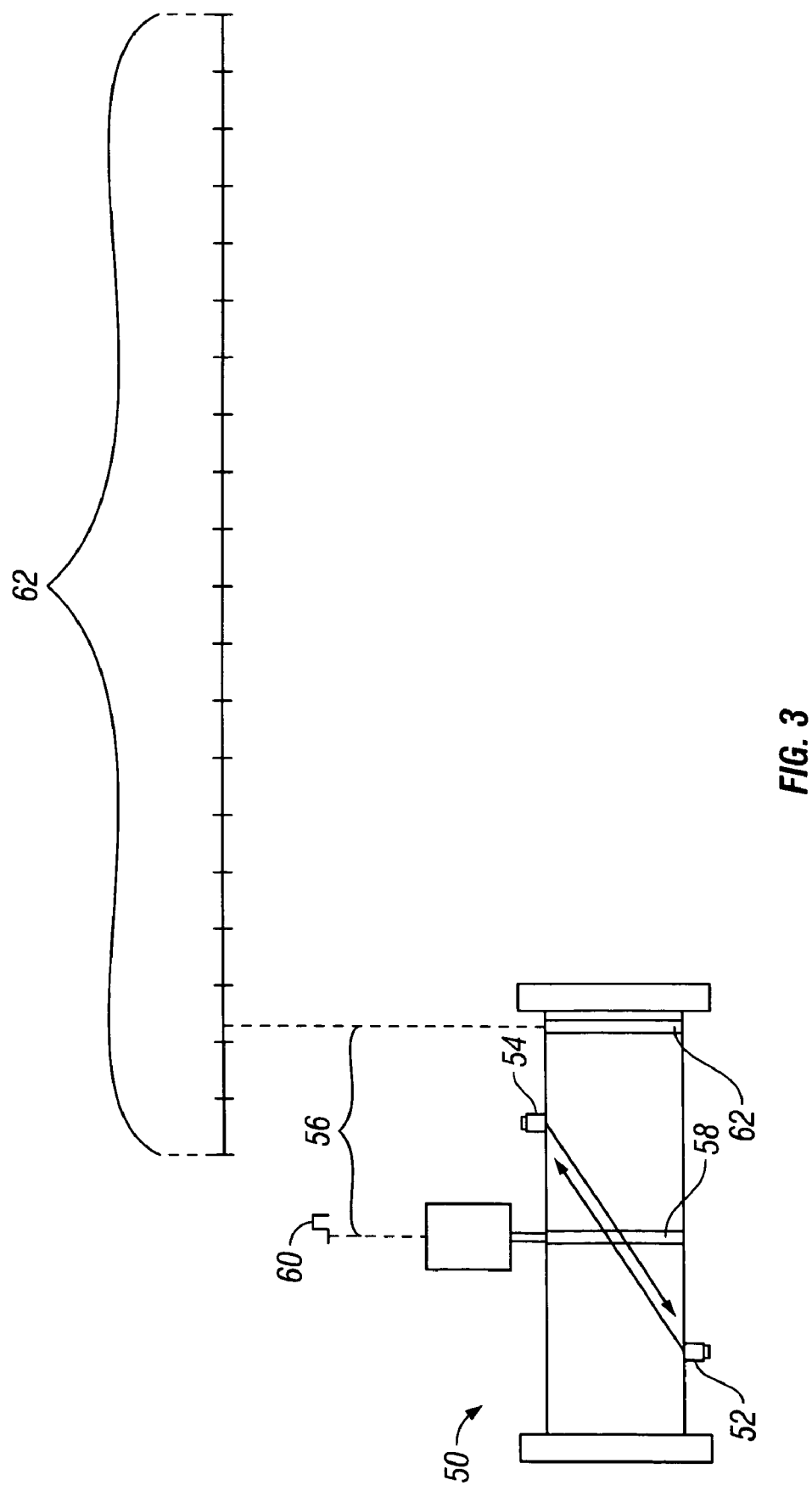
FIG. 3 is a side elevational view schematic, in cross-section, showing the interior components of a computational flowmeter with a computationally derived integration of volumetric flow.

The same is not true of computational flowmeter 50 shown in FIG. 3. Meters of this type must integrate the flow field through data assimilation and calculation after the actual measurement event. Such is the case with ultrasonic flowmeters and Coriolis mass flow meters. In more detail, computational flowmeter 50 comprises one or more transducers 52 and 54. In operation transducer 52 may produce, for instance, an acoustic signal which is subsequently received by 54. Transducers may be excited electrically, magnetically, vibrationally, by impact or the like, to produce a signal, such as an acoustic signal, that can be utilized by flowmeter 50 in measuring fluid flow directly or indirectly. Transducer 54 may also produce an acoustic signal or sound pulse which is subsequently received by transducer 52. The difference in the speed of sound and/or other physical phenomena measurement as used in the different types of computational flowmeters may be utilized to determine the flow through computational flowmeter 50. It will be appreciated that some time delay or time interval as indicated at 56 occurs between the time the flow is measured and a pulse output 60 is generated by computational flowmeter 50. It will be appreciated that during the data sampling and computation time period as indicated at 56, that a fluid section at position 58 moves to position 62.

Therefore, the inventor submits that the assumption that the same flow profile at the meter occurs in the prover is simply not true for computational flowmeters, as it is for non-computation flowmeters. Moreover, the delay or interval 56 can vary due to temporary causes such as changes in fluid viscosity and types of fluid. As well, the delay or interval 56 can vary gradually due to build up or caking or coating over the one or more sets of transducers 52 and 54. In other words, the measurement event (defined herein as the excitation of the first transducer in the array) and the fluid that is correlated with that event as indicated at 58 are followed by processing and transducer wait states that introduces a delay in the pulse output 60. The representative output pulse 60 is therefore no longer correlated in time with the fluid that it represents.

The inventor submits that errors in proving computational flowmeters when tested using dual chronometer small volume provers arise for this reason. The error is especially significant for small volume provers. For instance, a 4-inch meter operating at 1000 GPM will pass approximately 135 linear inches of fluid in 1 second (16.6 gallons). If the flowmeter delay or time interval 56 is 50 milliseconds, and the measurement time 62 for the small volume prover is one second, then it will be appreciated that the error can be very significant. For large volume provers, the error is still present but the delay will be a much smaller portion of the large volume measurement time. For this reason, the inventor submits that computational flowmeters have tested much better with large volume provers.

Figure 4:
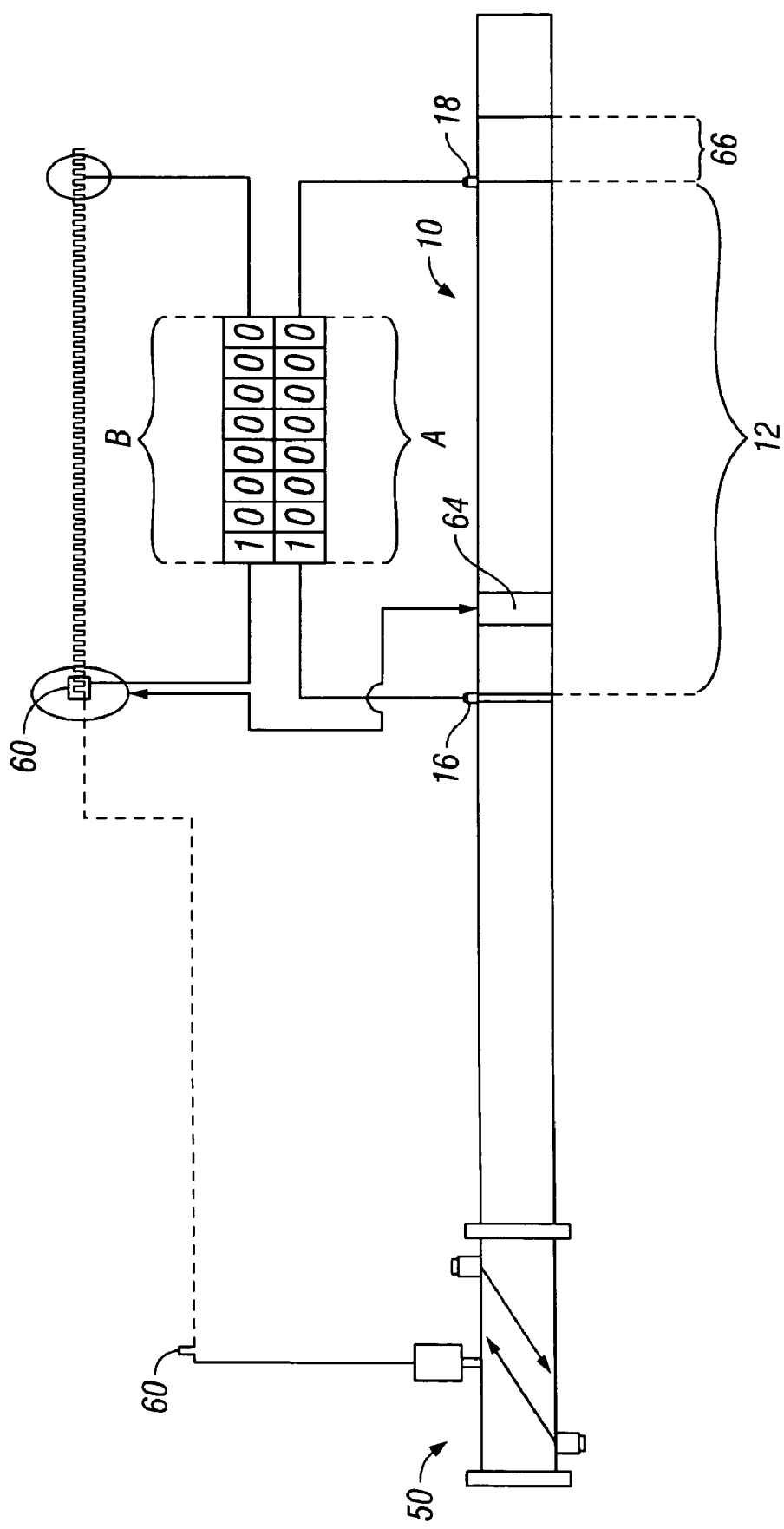
FIG. 4 is a side elevational view, in cross-section, showing a computational flowmeter upstream from a double chronometry prover and the timing relationships, pulse train, and errors in the fluid volume measured in accord with one possible embodiment of the present invention.

The error impact on meter proving is illustrated in the context of meter prover 10 measurement system in FIG. 4. Where meters with computationally derived output signals are employed, an error is created by virtue of the inherent measurement and processing delays. The first pulse 60 collected after the prover displacer encounters the first detector will represent a volume of fluid 64 that is downstream of the detector. The linear displacement of fluid represented by the meter pulse will be equal to the time displacement created by the meter. This linear displacement can vary for various reasons between times when the meter is proven.

A computational flowmeter with a very conservatively estimated delay of 50 milliseconds will introduce as much as a 5% error in the data collected during a 1 second proof. It will therefore be appreciated that the calibrated volume 12 is not equivalent to the volume actually measured. In the end, this volume for which there is no comparative data in the form of meter pulses, is used and produces an error in the meter factor calculation. The difference in overlap between the two volumes will be the volume indicated at 66. However, this volume 66 (which should have been included for the test) is discarded.

Three types of provers are considered here; however similar effects are expected in gravimetric and volumetric provers that are not of "in-line" construction. The three types specifically considered here include unidirectional (ball and piston), bidirectional ball, and ballistic style provers such as the Brooks Compact or Calibron units. The illustrations presented here include dual chronometry on a ballistic prover. A direct comparison of meter volume and prover volume as in conventional provers would not include the dual clocks illustrated here.

As discussed above, dual chronometry provers utilize two clocks, indicated here as clock A and clock B, to control the collection of meter pulses so as to collect only whole pulses and avoid the difficulty of reconciling partial pulses against the prover's collected volume. This is accomplished by starting the pulse collection with the first whole pulse after the first detector 16 in the prover is tripped. Simultaneously, high speed clock B begins timing the duration of the pulse collection. High speed clock A begins when the first detector 16 is tripped. High speed clock A is stopped when displacer trips final detector switch 18. High speed clock B is stopped with the leading edge of the first flowmeter pulse after high speed clock A has stopped.

Figure 5:
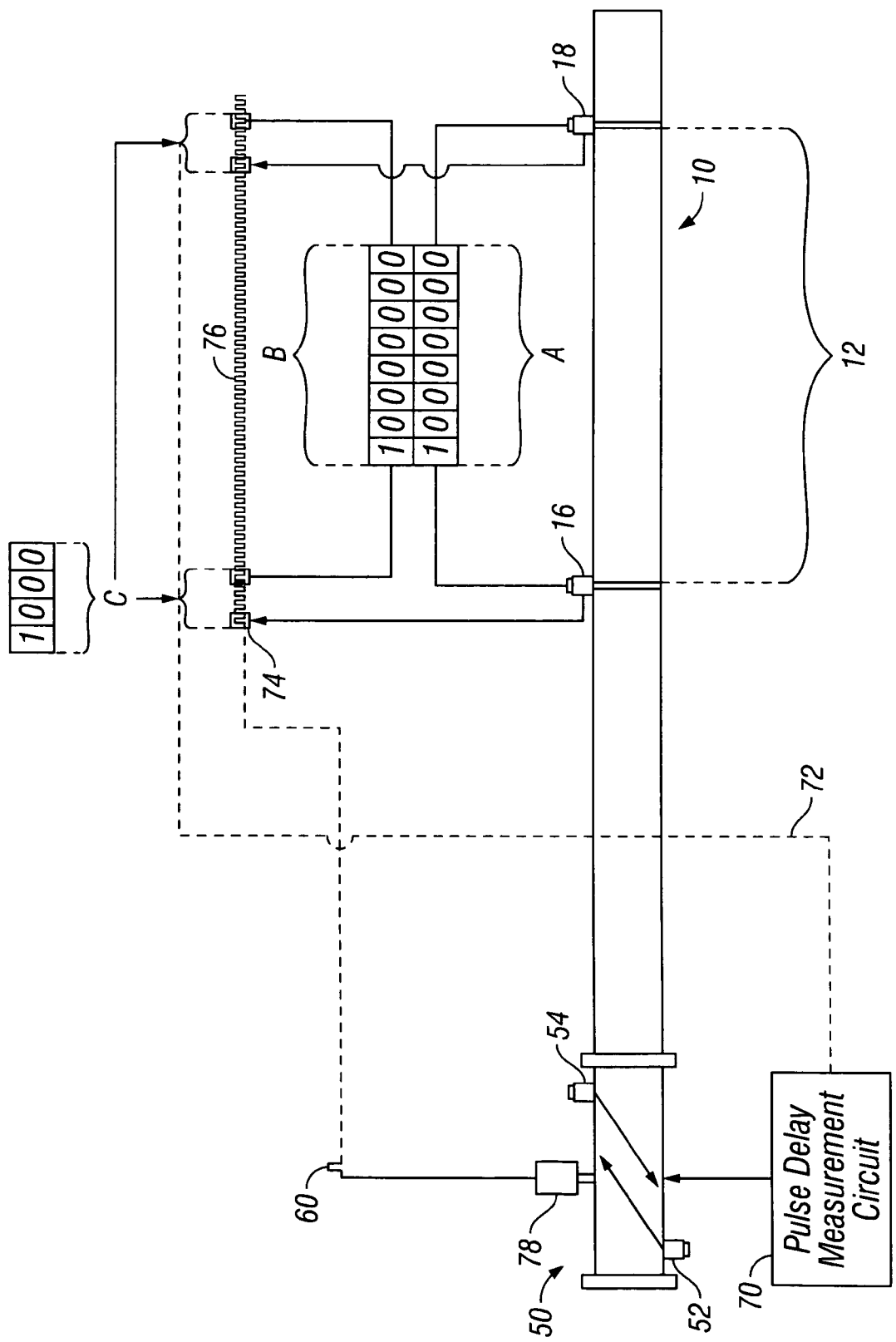
FIG. 5 is a side elevational view, in cross-section, showing a computational flowmeter upstream from a double chronometry prover and the timing relationships, pulse train, and corrections to the fluid volume measured in accord with one possible embodiment of the present invention.

FIG. 5 illustrates solutions to the problem in accord with the present invention utilizing pulse delay or time interval C measurement module and/or software assembly 70.

Referring to the pulse train output 76, pulse 74 represents the first increment of fluid in the prover and is the real time representative of fluid passing the meter at the initiation of the proof cycle (synchronous movement of the liquid). Pulse 74 is not yet available for collection by the prover instrumentation. However, insertion of the appropriate delay or time interval C will reconcile the temporal mismatch.

Pulse interval measurement circuit 70 is utilized to determine delay or time interval C. Delay or time interval C may be measured by producing a single test cycle or a selected number of cycles from a test function available (either manually or through software) that would actuate the measurement cycle for the delay C. Pulse delay or time interval measurement circuit or temporal reconciliation module 70 may be operable for determining the delay and/or making starting and stopping adjustments for highly accurate clock B so that the fluid volume measurement by flowmeter 50 is matched to the calibrated fluid volume through prover 10. The data may be collected and subsequently time shifted as desired utilizing software.

Pulse delay or time interval measurement circuit and/or software module (which also be referred to as temporal reconciliation module) 70 may have various components in different instruments such as the flowmeter or prover or may be located within the flowmeter entirely. For instance, one part of pulse delay or time interval measurement circuit 70 may produce data for measurement of the delay or time interval C for use in prover software and/or may actually make a measurement of the time from excitation of the first measurement element (transducer or otherwise such as transducer 52) to production of the associated output pulse 60, i.e., a measurement of delay C.

In another embodiment of the invention, either separately or in conjunction with measurements of a test cycle, delay or time interval C may be measured continuously during operation of the meter for constant monitoring used during proving and at other times. As well, various contributory aspects of delay or time interval C may be separately recorded, e.g., the time between initial sound pulse production at the transducers 52 and 54 and the receipt of the return pulses, the time spent analyzing the data in calculation module 78, the time spent calculating flow and pulse production in calculation module 78, and so forth. In other words, all aspects which produce any part of delay C may be measured, transmitted, recorded, or the like as desired. Software may be utilized with this information for time shifting the flowmeter output data so that it is the flow volume that is synchronous or matches with the calibrated flow volume.

The delay output signal(s) 72 may be provided on separate output(s) on the flowmeter or may be embedded within the pulse train output signal or otherwise transmitted, recorded, stored, or used as desired.

For instance, in one possible embodiment, the delay output signal 72 that indicates the beginning of the test cycle may be provided as a separate output at the flowmeter. In another embodiment, a signal representative of the delay may be encoded into the output pulse train or otherwise be combined such as by modulation, use of different frequencies, or the like.

The prover data collection instrumentation (whether discreet components or discreet components integrated with software as in a flow computer and/or control device) may add an input (start test cycle indicator) to indicate the start of a test which determines the delay. The prover data collection instrumentation may also add an additional high speed clock "C" register as indicated in FIG. 5. In one possible embodiment, high speed clock "C" may measure the duration of the delay or time interval exhibited by the meter from excitation of the first measurement component, e.g., element 52, until the output pulse 60 is produced.

The invention may utilize modified software or hardware components from presently available flowmeters and/or provers, or make additions to them to insert the duration of the delay expressed in the test cycle C to the collection of meter pulses in such a way as to delay their collection for that period of time along with the start of the pulse collection clock register (clock B). For instance, the prior art second detector 18 function of discontinuing pulse collection may be altered to add the duration of the test cycle C to its real time actuation. All other functions associated with the prover detector switches may remain unaltered.

In another embodiment, timing information and information from clocks A, B, and C (or output(s) 72) may be provided to a software controlled processor which then provides the desired correction. In this way, pulse stream 76 produced by flowmeter 50 is temporally shifted or reconciled with the calibrated prover fluid volume 12.

For use with flowmeters/provers in the case of non-computational flow integration, the system may be disabled because for non-computational flowmeters the prior art process is successful in light of the fact that the first pulse collected is contiguous in time with the volume represented and the slight offset in pulse collection is reconciled by the ratio of collected clock ticks from timing the proof duration and the duration of time to collect pulses.

In one embodiment of the invention, the invention may comprise a time shifting method for shifting a selected time interval of a series of flowmeter output pulses for comparison with the calibrated flow volume that flows in the interval defined by starting and stopping timer A. Some time interval, which may be selected in various ways as discussed hereinbefore, may be added or possibly subtracted as desired for the particular testing situation. In one possible preferred embodiment, the time shifting may preferably be used to match the measured flowmeter volume with the timing of the calibrated flow volume of timer A. The shifting may take place in real time or may be the result of operating on stored data.

Accordingly, the foregoing disclosure and description of the invention is illustrative and explanatory thereof, and it will be appreciated by those skilled in the art, that various changes in the ordering of steps, ranges, hardware, software, and/or attributes and parameters, as well as in the details of the illustrations or combinations of features of the methods and apparatus discussed herein, may be made without departing from the spirit of the invention.

What is claimed is:

1. A flowmeter/proving system for proving a computational flowmeter, one or more measurement elements for said computational flowmeter to produce a flowmeter output signal representative of fluid flow through said computational flowmeter, a timer for measuring a time interval A for a calibrated volume of fluid, said flowmeter/proving system comprising:
    a temporal reconciliation assembly operable for producing signals for selecting a time interval B of said flowmeter output signal for comparison with said time interval A.

2. The flowmeter/prover system of claim 1, further comprising that said temporal reconciliation assembly is operable for producing one or more time interval signals related to a time interval C, said time interval C being utilized for said selecting of said time interval B of said flowmeter output signal for comparison with said flow time interval A.

3. The flowmeter/prover system of claim 2, wherein said time interval C comprises a time measurement beginning with electrical excitation of one or more of said one or more measurement elements.

4. The flowmeter/prover system of claim 2, wherein said time interval C comprises a time measurement signal ending with production of an output pulse for said flowmeter output signal.

5. The flowmeter/prover system of claim 1, wherein said selecting a time interval B is directed to selecting a volume of fluid flow measured by said computational flowmeter which corresponds to said calibrated volume of fluid flow through said prover.

6. The flowmeter/prover system of claim 2, wherein said flowmeter output signal comprises a series of flowmeter pulses, and said time interval C comprises measurement from electrical excitation of one or more of said one or more measurement elements until production of a flowmeter pulse.

7. The flowmeter/proving system of claim 2, wherein said flowmeter output signal comprises a series of flowmeter output pulses, and said time interval B contains a whole number of said flowmeter output pulses.

8. The flowmeter/proving system of claim 7, wherein said time interval B starts at a first whole pulse after said time interval C after time interval A starts.

9. The flowmeter/proving system of claim 7, wherein said time interval B stops after a next whole pulse which occurs after time interval A stops, and then after time interval C.

10. The flowmeter/proving system of claim 1, wherein software is utilized for selecting said time interval B.

11. A flowmeter with a flowmeter housing, one or more measurement elements mounted to said flowmeter housing, said one or more measurement elements being utilized to produce a series of flowmeter output pulses representative of a fluid flow through said flowmeter housing, said flowmeter utilizing no moving parts within said fluid flow for measuring said fluid flow, said flowmeter comprising:
    a pulse production interval measurement module operable for producing one or more signals representative of one or more intervals between at least one excitation of said one or more measurement elements and production of a flowmeter output pulse in response to said at least one excitation.

12. The flowmeter of claim 11, wherein said pulse production interval measurement module is operable for producing said one or more signals representative of said one or more intervals between an initial excitation of at least one of said one or more measurement elements and a subsequent flowmeter output pulse.

13. The flowmeter of claim 12, wherein said subsequent flowmeter output pulse is representative of an amount of said fluid flow after said initial excitation of said at least one of said one or more measurement elements and production of said subsequent flowmeter output pulse.

14. The flowmeter of claim 11, further comprising software or hardware or a combination of software and hardware operable for utilizing said one or more signals from said pulse production interval measurement module for selecting a time interval B of said flowmeter output signal for comparison with a time interval A during which time a calibrated volume of fluid flows.

15. A method for proving a computational flowmeter, said computational flowmeter producing a flowmeter output signal, comprising:
    determining a time interval C between a measurement of a fluid flow through said computational flowmeter and a production of said flowmeter output signal;
    determining a time interval A for a calibrated volume of fluid to flow through a pipe; and
    utilizing said time interval C for selecting a time interval of said flowmeter output signal for comparison with said time interval A to prove said flowmeter.

16. The method of claim 15, further comprising:
    determining said time interval A for said calibrated volume of fluid through a pipe by starting a clock A and stopping said clock A;

selecting said time interval of said flowmeter output by starting a clock B after starting clock A, and after said time interval C.

17. The method of claim 16, further comprising selecting said time interval of said flowmeter output by stopping said clock B after stopping said clock A, and after said interval C.

18. The method of claim 17, further comprising:
producing said flowmeter output signal as a series of flowmeter output pulses wherein each flowmeter output pulse is representative of a volume of fluid; and
selecting said time interval of said flowmeter output by starting said clock B with a first whole flowmeter output pulse after starting clock A, and after said interval C, and stopping said clock B with a next whole flowmeter output pulse after stopping said clock A, and after said interval C.

19. The method of claim 15, further comprising:
implementing said method utilizing software or hardware or a combination of software and hardware.

20. The method of claim 15, further comprising:
utilizing collected and stored data for said selecting of said time interval of said flowmeter output signal for comparison with said time interval A to prove said flowmeter.

* * * * *